(12) United States Patent
Halák et al.

(10) Patent No.: US 8,792,484 B2
(45) Date of Patent: Jul. 29, 2014

(54) DEVICE FOR RECEIVING OF HIGH-DEFINITION VIDEO SIGNAL WITH LOW-LATENCY TRANSMISSION OVER AN ASYNCHRONOUS PACKET NETWORK

(75) Inventors: Jiří Halák, Kněžmost (CZ); Sven Ubik, Prague 9 (CZ); Petr Žejdl, Prague 9-Čakovice (CZ)

(73) Assignee: CESNET, z.s.p.o., Prague (CZ)

( * ) Notice: Subject to any disclaimer, the term of this patent is extended or adjusted under 35 U.S.C. 154(b) by 59 days.

(21) Appl. No.: 13/582,836

(22) PCT Filed: Mar. 21, 2011

(86) PCT No.: PCT/CZ2011/000024
§ 371 (c)(1),
(2), (4) Date: Sep. 5, 2012

(87) PCT Pub. No.: WO2011/116735
PCT Pub. Date: Sep. 29, 2011

(65) Prior Publication Data
US 2012/0327302 A1 Dec. 27, 2012

(30) Foreign Application Priority Data

Mar. 26, 2010 (CZ) .................................... 2010-226

(51) Int. Cl.
*H04L 12/66* (2006.01)
*H04L 29/06* (2006.01)
*H04N 7/26* (2006.01)

(52) U.S. Cl.
CPC ............ *H04L 65/4069* (2013.01); *H04L 65/00* (2013.01); *H04L 65/4076* (2013.01); *H04N 19/00521* (2013.01)
USPC ........................................................ 370/356

(58) Field of Classification Search
None
See application file for complete search history.

(56) References Cited

U.S. PATENT DOCUMENTS 5,381,145 A * 1/1995 Allen et al. .................... 341/107
5,425,061 A 6/1995 Laczko, Sr. et al.
(Continued)

FOREIGN PATENT DOCUMENTS

CZ 18271 U 2/2008
EP 0 924 935 A2 6/1999
(Continued)

OTHER PUBLICATIONS

International Search Report (PCT/ISA/210) issued on Nov. 8, 2011, by the Czech Republic Patent Office as the International Searching Authority for International Application No. PCT/CZ2011/000024.

(Continued)

*Primary Examiner* — John Blanton
*Assistant Examiner* — Christopher Crutchfield
(74) *Attorney, Agent, or Firm* — Buchanan Ingersoll & Rooney PC

(57) ABSTRACT

A device based on the proposed solution allows high-definition video transmissions with low latency over an asynchronous packet computer network such as Ethernet. The transmitter and receiver comprise a video input or output module, an FPGA board, and an optical transceiver for transmission and reception of a signal over the Ethernet network. The principle of the new device is that the receiver comprises one or more tunable oscillators connected to the FPGA board comprising a module for packet reception, and one or more sets of modules for video data processing.

3 Claims, 1 Drawing Sheet

(56) References Cited

U.S. PATENT DOCUMENTS

| | | | |
|---|---|---|---|
| 6,148,051 | A | 11/2000 | Fujimori et al. |
| 7,269,225 | B2 | 9/2007 | Shiozawa et al. |
| 2006/0050971 | A1* | 3/2006 | Page et al. ................ 382/232 |
| 2010/0278508 | A1* | 11/2010 | Aggarwal ................ 386/109 |
| 2011/0032996 | A1* | 2/2011 | Zhang ................ 375/240.25 |

FOREIGN PATENT DOCUMENTS

| | | |
|---|---|---|
| EP | 1 339 182 A2 | 8/2003 |
| EP | 1 471 745 A1 | 10/2004 |

OTHER PUBLICATIONS

Written Opinion (PCT/ISA/237) issued on Nov. 8, 2011, by the Czech Republic Patent Office as the International Searching Authority for International Application No. PCT/CZ2011/000024.

Czech Republic Search Report issued on Feb. 28, 2011 for Application No. VP 2010-226.

Daisuke Shirai et al., "Real Time Switching and Streaming Transmission of Uncompressed 4K Motion Prictures", Feb. 1, 2009, vol. 25, No. 2, pp. 192-197, XP-025468595.

IntoPIX, "Prestine JPEG 2000 Boards", Nov. 28, 2009, pp. 1-6.

Sun Yong Kim et al., "Requirements for Developing Ultra-Realistic Live Streaming Systems", International Symposium on Intelligent Signal Processing and Communication Systems (ISPACS 2009), Dec. 7-9, 2009, pp. 175-178. XP-031612867.

Takashi Shimizu et al., "International Real-Time Streaming of 4K Digital Cinema", Future Generations Computer Systems, vol. 22, No. 8, pp. 929-939, XP 025052112.

Daisuke Shirai, et al., "4K SHD Real-Time Video Streaming System With JPEG 2000 Parallel CODEC", IEEE Asia Pacific Conference on Circuits and Systems, Dec. 1, 2006, pp. 1855-1858, XP 031071218.

Anonymous, "NTT Electronics and NTT Exhibit New Products and Technologies This April at the NAB2007 in Las Vegas", NTT Electronics, Apr. 11, 2007, pp. 1-2, XP-002658976.

* cited by examiner

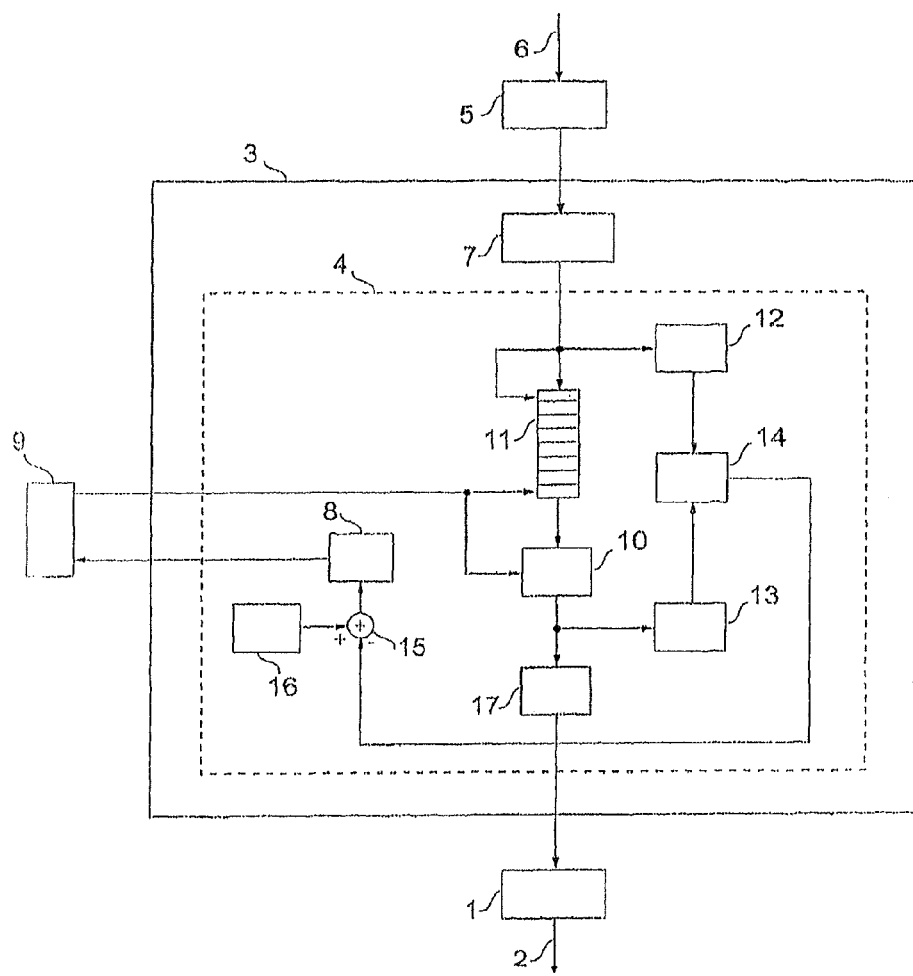

DEVICE FOR RECEIVING OF HIGH-DEFINITION VIDEO SIGNAL WITH LOW-LATENCY TRANSMISSION OVER AN ASYNCHRONOUS PACKET NETWORK

FIELD OF THE INVENTION

The technical solution relates to the high-definition (HD, 2K, 4K and more) video signal transmission over a packet computer network. It belongs to the area of telecommunication technology and services.

DESCRIPTION OF THE PRIOR ART

There are several known categories of solutions for video signal transmission over a network.

The first category includes single-purpose systems converting an electrical signal from video inputs directly into an electrical or optical signal suitable for network transmission and performing the reverse conversion at the recipient side of transmission. As the video signal is not encapsulated, into frames or packets, it can only be transmitted over a dedicated link of limited Length, not over the Internet.

The second category comprises the equipment that encapsulates video data into frames for transmission over a synchronous computer network such as SONET/SDH. In this case the clock of a video receiver can be derived from the clock of a synchronous computer network. Therefore this solution is not suitable for transmission over an asynchronous computer network such as Ethernet.

The third category consists of devices that encapsulate video data into packets for transmission over an asynchronous computer network such as' Ethernet. The device can be either a PC-based systems equipped with suitable cards for video signal input and output (grabber car ds, video adapters, compressing cards) and a card for network transmission (network card) inserted into PC slots, or a specialized equipment. The differences in transmitter and receiver rates are solved by a sufficiently sized buffer at a receiver side which, however, as a consequence increases the delay of video transmission. In the case of PC-based systems, to transmit high-definition video signals, a complex system consisting of many cards and possibly more PCs is required limiting its portability.

The above analysis shows that a system for high-definition video transmission with low latency over an asynchronous packet computer network such as Ethernet is very difficult to obtain with existing technology.

SUMMARY OF THE INVENTION

The proposed solution of a device for high-definition video network transmission eliminates the disadvantages shown above. The transmitter and receiver comprise a video input or output module for video data input or output through one or more video inputs or outputs, an FPGA (Field-Programmable Gate Array) board, and an optical transceiver for transmission and reception of a signal over the Ethernet network. The principle of the new device is that the receiver comprises one or more tunable oscillators connected to the FPGA board comprising a module for packet reception, and one or more sets of modules for video data processing. The number of tunable oscillators equals the number of video data processing module sets. Each video data processing module set on the FPGA board in the receiver comprises a buffer, where its data input and writing clock input are connected via the packet reception module to the electrical output of the optical transceiver, and its data output is connected to the input of a video processor. The video processor output is connected via a channel synchronization module to the video output module. The module set in addition comprises a counter whose one input is connected via the first detector of a selected row in a frame to the buffer data input, and whose another input is connected via the second detector of a selected row in a frame to the video processor output. Counter output is connected to the inverting input of a subtractor, whose positive input is connected to the memory of a required regulation value, and whose output is a difference against the required value put to the PID (Proportional-Integral-Derivative) regulator input. The PID regulator controls via its output the frequency of a tunable oscillator that is connected to the video processor clock input and buffer reading clock input.

In one embodiment, video outputs can be in the form of one or more SMPTE (Society of Motion Picture and Television Engineers) 259M (SDI, Serial Digital Interface), and/or SMPTE 292M (HD-SDI), and/or SMPTE 424 (3G-SDI), and/or SMPTE 372 (dual-link HD-SDI) channels.

In an advantageous embodiment, the PID regulator module can be implemented as a program for a processor embedded in an FPGA circuit on the FPGA board.

The proposed device is characterized by the receiver's capability to adjust the data rate onto video outputs to the data generation rate on the transmitter's side, and to display the beginning of a frame at the correct position, even though the transmitter and receiver are interconnected by an asynchronous packet network such as Ethernet, which cannot be used for receiver clock recovery in line with a transmission data rate, and this is all possible without the need for a large frame memory increasing the delay.

The instant video data volume in the FIFO-type buffer depends on delay variation when data is transmitted over a network. When the transmitter and receiver clocks differ, the buffer is systematically slowly emptied or overflowing, ultimately leading to a loss in transmitted video data. The suggested solution eliminates this problem.

BRIEF DESCRIPTION OF THE DRAWINGS

An example of a device for receiving high-definition video data with low latency over an asynchronous packet network based on the proposed solution is schematically shown in the enclosed drawing.

DETAILED DESCRIPTION OF THE PREFERRED EMBODIMENTS:

A device for receiving high-definition video data over an asynchronous packet network can be described by the following functional blocks (see enclosed schematic diagram): video output module 1, video outputs 2, FPGA board 3, packet reception module 7, one or more video data processing module sets 4, optical transceiver 5, Ethernet interface 6, one or more tunable oscillators 9. Each video data processing module set 4 comprises: PID regulator 8, video processor 10, buffer 11, first detector 12 of a selected row in a frame, second detector 13 of a selected row in a frame, counter 14, subtractor 15, memory 16 of required regulation value, and channel synchronization module 17.

An electrical output of an optical transceiver 5 is connected to the input of the FPGA board 3, whose output is connected to the input of the video output module 1 leading to video outputs 2. A control input of each tunable oscillator 9 and its frequency output are connected across the FPGA board 3 to the related video data processing module set 4. Data input and writing clock input of a buffer 11 are connected across a packet reception module 7 to an electrical output of the optical transceiver 5. Data output of the buffer 11 is connected to the input of the video processor 10, the output of which leads across a channel synchronization module 17 to the video output module 1. The first input of the counter 14 is across the first detector 12 of a selected row in a frame interconnected to data input of buffer 11, and the second input of the counter 14 is across the second detector 13 of a selected row in a frame interconnected to the output of the video processor 10. The output of the counter 14 is interconnected with an inverting input of the subtractor 15, whose positive input connects to the memory 16 of required regulation value, and whose output is connected to the input of the PID regulator 8. The output of the PID regulator 8 is connected to the control input of a tunable oscillator 9, whose frequency output is connected to the clock input of the video processor 10 and to the reading clock input of the buffer 11.

An optical transceiver 5 converts the signal between the Ethernet interface 6 and its electrical output. A packet reception module 7 decapsulates video data from packets incoming from an Ethernet network, which means that it typically deploys communications protocols at link, network, and transport network layers. A packet reception module 7 further splits video data into individual module sets 4 for video data processing according to the video outputs for which it is determined. A video processor 10 converts video data into video output formats. A channel synchronization module 17 synchronizes video output groups by framing. A video output module 1 performs voltage and impedance adjustments between the FPGA board 3 and video outputs 2.

A counter 14 can be initialized by a row of the selected number coming into buffer 11 according to the data from the first detector 12 of a selected row in a frame and it can be stopped by a row of this number outgoing from the video processor 10 according to the data from the second detector 13 of a selected row in a frame. In that case the value of the counter 14 becomes positive. Alternatively, the counter 14 can be initialized by a row of the selected number outgoing from the video processor 10 according to the data from the second detector 13 of a selected row in a frame and it can be stopped by a row of this number coming into buffer 11 according to the data from the first detector 12 of a selected row in a frame. In that case the value of the counter 14 becomes negative. If the row output into video outputs 2 advances its entry into buffer 11, the video processor 10 sends an alternative row to video outputs 2, for example a copy of the preceding row.

If the average delay of a selected row between the input of the buffer 11 and the output of the video processor 10, as determined by the counter 14, differs in the subtractor 15 from the content of memory 16 of the required regulation value, the PID regulator 8 changes the frequency of the tunable oscillator 9 in order to equalize the delay to the required value. Regulation can use any row in a frame, typically the first visible one.

This method of determining regulated value delta along with a selection of the required regulation value also enables a stabilization of the frame position, that is displaying the beginning of a frame in the correct position. The regulation can be deployed in any digital video data transmission in which it is possible to determine the sequence numbers of rows within a frame. A required regulation value depends on the video output types and the frame format and has to be empirically set for highest video stability. Using a positive required regulation value enables to set up the advance between a selected row enters a buffer and when it is displayed, and so optimize filling the buffer 11.

Video outputs can comprise, for example, one or more SMPTE 259M (SDI), and/or SMPTE 292M (HD-SDI), and/or SMPTE 424 (3G-SDI), and/or SMPTE 372 (dual-link HD-SDI) channels.

Useful characteristics of dividing the video outputs 2 into groups of one or more members where each group is connected across the video output module 1 to an independent video data processing module set 4 with an independent tunable oscillator 9 is the capability of each group of video outputs 2 to be deployed for video signal transmission from an independent video source at the transmitter side, for example, independent HD or 2K video signals.

Another useful characteristic is the frame synchronization capability within each group of video outputs 2 in the channel synchronization module 17. Synchronized video outputs 2 can be used for transmission of a higher definition (4K or more) signal split into parts or for a stereoscopic transmission (3D).

In one embodiment the video outputs 2 comprise one or more SMPTE 259M (SDI), and/or SMPTE 292M (HD-SDI), and/or SMPTE 424 (3G-SDI), and/or SMPTE 372 (dual-link HD-SDI) channels. Data signals on these connectors can also contain related audio channels.

Besides the video signal, the device can also process and transmit one or more audio channels. Format of transmitted data over a network typically relates to the format of video inputs and outputs, usually excluding dark frame parts not containing any audio signal, or to recommendations for video data transmission (e.g., RFC 4175).

INDUSTRIAL APPLICABILITY

The technical solution is well suitable for industrial applications in private, local, national, and international computer networks for high-definition video signal transmissions including real-time and low-latency transmissions, for example for remote interactive access to lectures, medical surgeries or film recordings in during post-production phase and for their presentation.

The invention claimed is:
1. A device for receiving a high-definition video signal with low latency over an asynchronous packet network, comprising:
   a video output module for video data output through one or more video outputs;
   an FPGA board; and
   an optical transceiver for signal reception through an Ethernet interface,
   wherein the FPGA board comprises a packet reception device that receives packets from the optical transceiver and one or more video data processing module sets, where an independent tunable oscillator with its control input and frequency output is connected across the FPGA board to each module set, where each module set comprises a buffer, whose data input and writing clock input are connected across the packet reception device to the electrical output of the optical transceiver, and whose data output is connected to the input of a video processor, whose output goes through a channel synchronization device to the video output module, and
   wherein each module set comprises a counter for determining delay of a selected row, whose first input is across a first detector of a selected row in a frame connected to the input of the buffer, and whose second input is across a second detector of a selected row in a frame connected to the output of the video processor, while the output of the counter is connected with an inverting input of a subtractor, whose positive input is connected to a memory of a required regulation value, where the output of the subtractor is connected to an input of a PID regulator, whose output is connected to the control input of the tunable oscillator, whose frequency output is connected to a clock input of the video processor and to a reading clock input of the buffer.

2. The device according to claim 1, wherein the video outputs comprise one or more SMPTE 259M, and/or SMPTE 292M, and/or SMPTE 424, and/or SMPTE 372 channels.

3. The device according to claim 1, wherein the PID regulator module is implemented as a program for a processor embedded in an FPGA circuit on the FPGA board.

* * * * *